United States Patent
Vannan

(10) Patent No.: US 6,525,671 B1
(45) Date of Patent: Feb. 25, 2003

(54) ROAD SURFACE FRICTION (RSF) MONITORING SYSTEM

(76) Inventor: Frederick Forbes Vannan, 8509 Foxglove Ave. NW., Clinton, OH (US) 44216

( * ) Notice: Subject to any disclaimer, the term of this patent is extended or adjusted under 35 U.S.C. 154(b) by 0 days.

(21) Appl. No.: 09/638,125

(22) Filed: Aug. 14, 2000

(51) Int. Cl.[7] .................................................. G08G 1/00
(52) U.S. Cl. .................... 340/901; 340/425.5; 340/438; 73/9
(58) Field of Search ............................. 340/901, 425.5, 340/438; 73/9

(56) References Cited

U.S. PATENT DOCUMENTS

| | | | | |
|---|---|---|---|---|
| 4,315,426 A | * | 2/1982 | Brandon ........................... 73/9 |
| 5,892,139 A | * | 4/1999 | Miyazaki .......................... 73/9 |
| 5,948,961 A | * | 9/1999 | Asano et al. ..................... 73/9 |
| 6,006,597 A | * | 12/1999 | Miyazaki .................... 73/118.1 |
| 6,166,645 A | * | 12/2000 | Blaney ......................... 340/583 |
| 6,276,189 B1 | * | 8/2001 | Hurson ............................. 73/9 |
| 6,324,461 B1 | * | 11/2001 | Yamaguchi et al. ........... 701/80 |

* cited by examiner

Primary Examiner—Toan N Pham

(57) ABSTRACT

A monitoring system alarms drivers of potentially dangerous road surface conditions such as water buildup or icing before it is perceptible to them reducing the possibility of an accident. The road surface friction (RSF) measurement analysis and alarm system monitors RFS utilizing either of two techniques: an extension of the vehicle's automatic braking system including those commonly referred to as the antilock braking system (ABS) to measure tire/wheel slip at constant velocity or accelerating; or an apparatus independent of ABS which rolls against the road surface to determine RSF condition. Both techniques analyze data and alarm or advise the driver of a potentially dangerous RSF condition.

3 Claims, 3 Drawing Sheets

ROAD SURFACE FRICTION (RSF) MONITORING SYSTEM

BACKGROUND

Road surface friction (RSF) influences the magnitude of tractive forces capable of being transmitted between a vehicle and the road. These tractive forces are commonly transmitted through a wheel and tire system. RSF is generally lower for a wet or ice-covered road surface than for a dry road surface.

Many accidents occur because a driver is not aware of RSF changes before he rounds a curve or applies braking in time to avoid an accident. This is particularly true at the beginning of a rain storm or as ambient temperature drops through the freezing point of water or salt water. The practice of salting highways makes it more difficult to determine the ambient temperature at which road surface icing occurs. Lightly applying brakes to determine how slippery a road surface is could cause loss of control of a vehicle if RSF conditions are poorer than expected. There is a need for this invention to alarm a driver of deteriorating RSF conditions before they become humanly perceptible.

SUMMARY OF INVENTION

The purpose of this invention is to inform the driver of a motor vehicle of changing road surface friction (RSF) conditions as they occur through an on-board alarm system so that vehicle operational adjustments, such as lowering speed or stopping, can be made before an accident occurs.

A system to measure the road surface friction of a road surface and to advise the driver of the condition is disclosed. The system has a means for measuring or sensing the RSF condition and a means for transmitting the RSF condition to the driver.

The system described above is most preferably mounted on the vehicle. There are two different methods disclosed for measuring or sensing, analyzing and transmitting the RSF condition to the driver. The first method disclosed is an on-vehicle RSF measurement system for measuring or sensing the RSF condition which is a part of the rotating vehicle wheel and braking system.

The second method disclosed is an on-vehicle RSF measurement system for measuring or sensing the RSF condition which is independent of the rotating vehicle wheel and braking system.

Data from either or both measurement systems is analyzed and used to alarm the driver of changing RSF conditions.

This drawing represents a drive tire and wheel rotating in the clock-wise direction as the vehicle moves to the right at constant velocity or is accelerating. When RSF falls below the threshold level, the torque being applied by the tire to the road surface will cause the tire to slip relative to the road surface through slippage angle S. The magnitude of the angle S is proportional to the length of the slip in distance and the duration of the slip shown in graph form in FIG. 2. Slip distance divided by slip duration equals average increased angular velocity during the slip and is shown as a slip peak in angular velocity FIG. 2.

DESCRIPTION OF DRAWINGS

Figure 2:
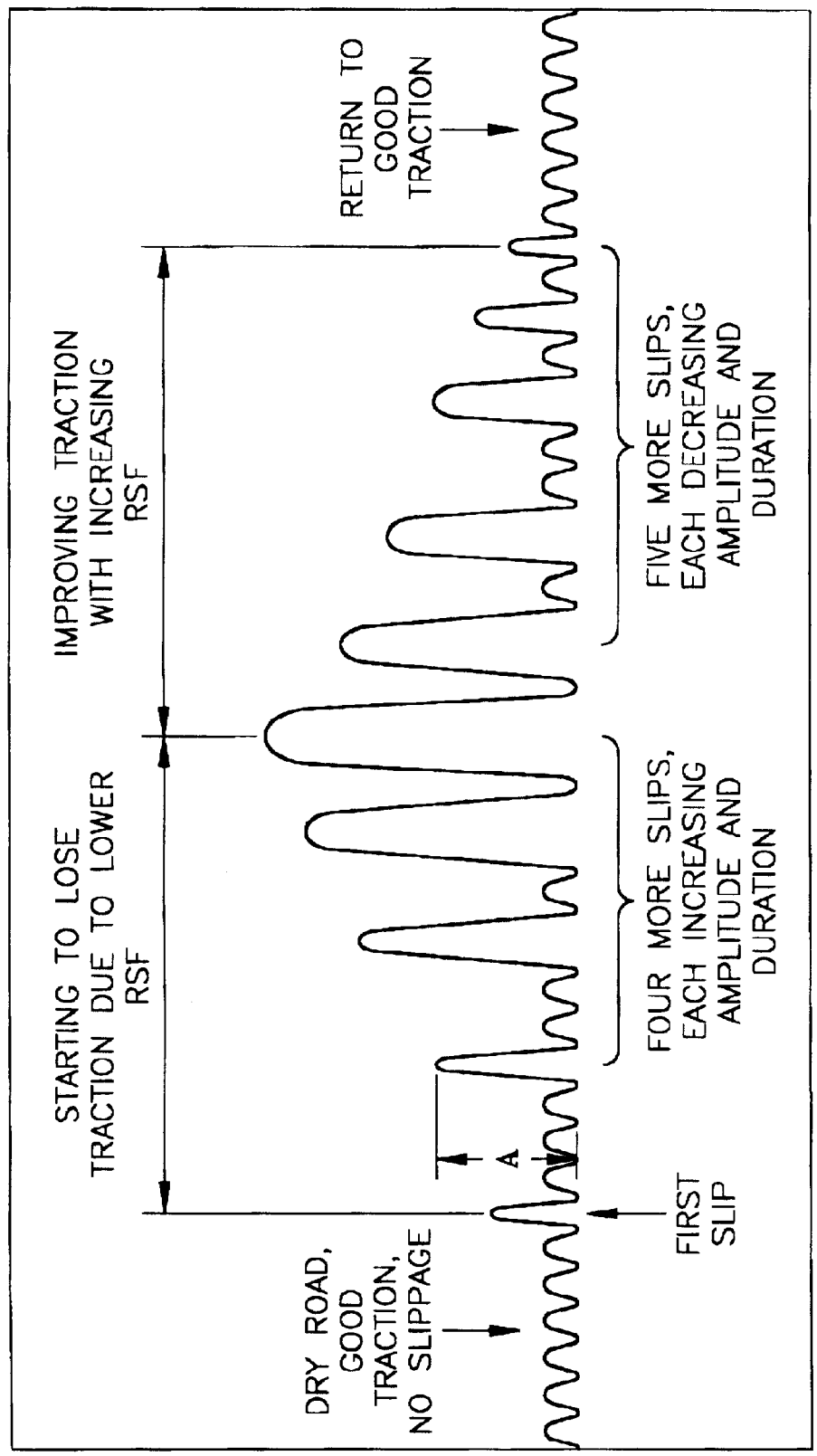

FIG. 2—"Typical Drive Wheel Slippage at Constant or Accelerating Vehicle Velocity"

This graph plots angular velocity of a drive wheel on the vertical axis as a function of time on the horizontal axis for a vehicle at constant velocity or that is accelerating. The example shows small and uniform variations in angular velocity at the beginning (left side) and ending (right side) of the graph when the vehicle is on dry or tractive roadway. The center portion of the graph represents a changing RSF condition where in slippage between the tire and road surface first increases, intermittently and then decreases intermittently while the vehicle maintains constant velocity. The slippage occurs because torque must be applied by the tire to the road surface to maintain constant vehicle velocity. If the vehicle was accelerating the graph would be inclined lower on the left side and higher on the right side but with each tire to road surface slippage indicated as shown. This system is intended to measure, analyze and transmit to the driver small amounts of slippage during acceleration or constant vehicle velocity which are too small to be humanly detected.

DESCRIPTION OF DRAWINGS

Figure 3:
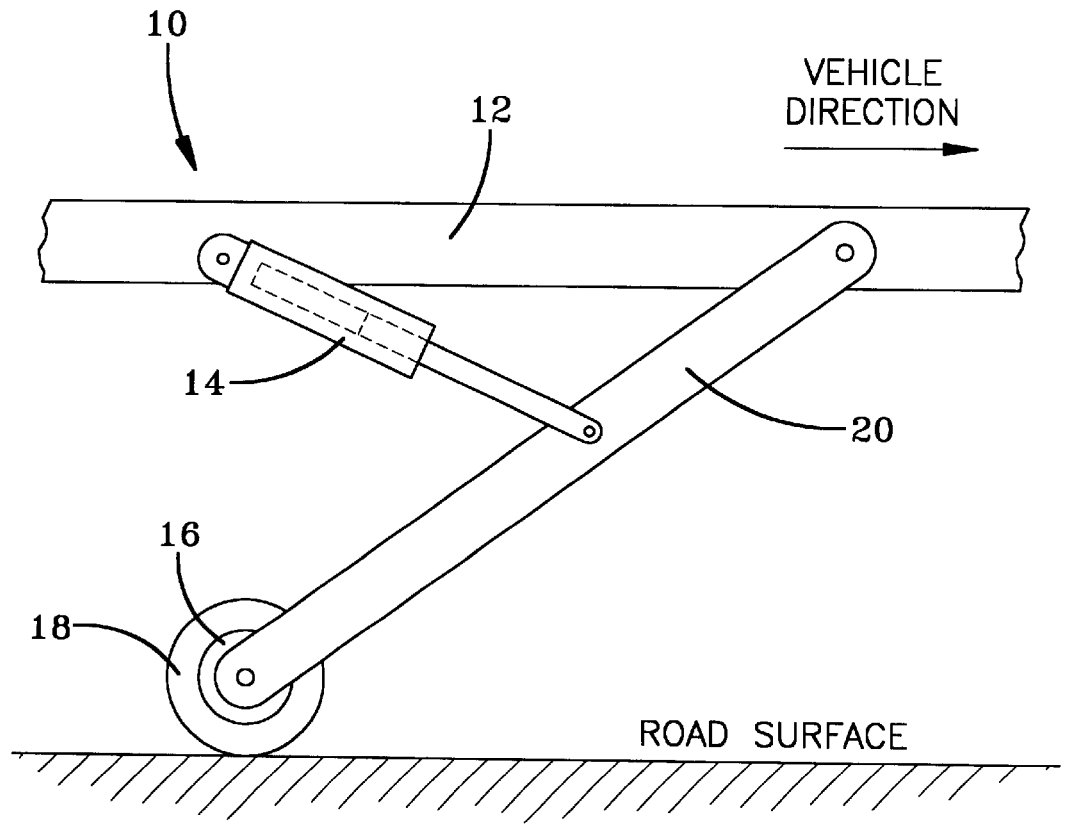

FIG. 3—"RSF Monitoring System Independent of Rotating Tire/Wheel/Brake Systems"

This drawing represents a device mounted near the front underside of a vehicle (reference numerals vehicle 10 and mounting 12) to measure or sense changing RSF condition. The device is comprised of an elastomeric rotating roller (reference numeral 18) a brake to resist rotation of the elastomeric roller (reference numeral 16) an encoder to measure angular velocity changes (reference numeral 16) and a support (reference numeral 20) and deployment mechanism (reference numeral 14). The brake resistance is large enough to prevent rotation of the elastomeric roller (18) in low RSF or "slippery" road surface conditions, but small enough to permit relatively constant angular velocity of the elastomeric roller in high RSF or dry and tractive road surface conditions. The elastomeric roller may be in constant contact with the road surface or deployed to contact the road surface manually or automatically at a desired frequency. This system is intended to measure, analyze and transmit to the driver small amounts of slippage when the vehicle is moving which are too small to be humanly detected.

DESCRIPTION OF DRAWINGS

Figure 4:
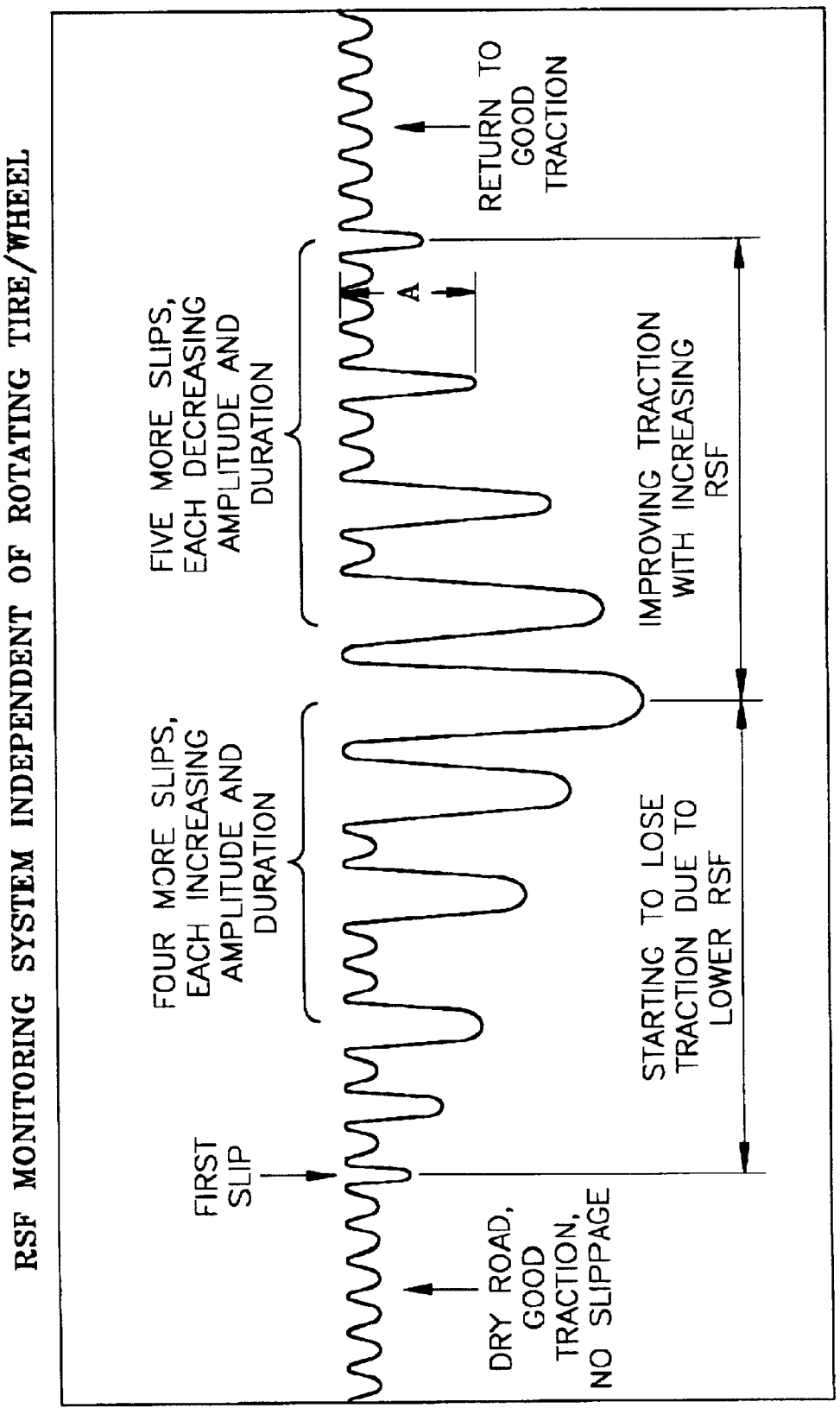

FIG. 4—Typical Angular Velocity Changes with RSF Independent Monitoring System

This graph plots angular velocity of the elastomeric roller in contact with the road surface on the vertical axis as a function of time on the horizontal axis for a vehicle at constant velocity. The example shows uniform variations in angular velocity at the beginning (left side) and ending (right side) of the graph when the vehicle is on dry or tractive roadway. The center portion of the graph represents a changing RSF condition wherein slippage between the elastomeric roller and the road surface first increases intermittently, causing reductions in angular velocity, and then slippage decreases intermittently while the vehicle maintains constant velocity. The slippage occurs because the resistance brake system (FIG. 3) is designed to resist rotation of the elastomeric roller (18) and lower its angular velocity in low RSF conditions. If the vehicle was accelerating graph would be inclined lower on the left side and higher on the right side and vice versa if the vehicle was decelerating but with each elastomeric roller to road surface slippage valley indicated as shown. This system is intended to measure, analyze and transmit to the driver small amounts of slippage during acceleration, deceleration, or constant vehicle velocity which are too small to be humanly detected.

DETAILED DESCRIPTION

This invention consists of a system for measuring changes in road surface friction (RSF) and informing the driver of a motor vehicle of this condition. The RSF monitoring system most preferable would be mounted on the vehicle.

On vehicle RSF monitoring systems fit into two basic categories: 1.) Systems which are included in the wheel and braking system and 2.) Systems which are independent of wheel and braking systems.

Figure 1:
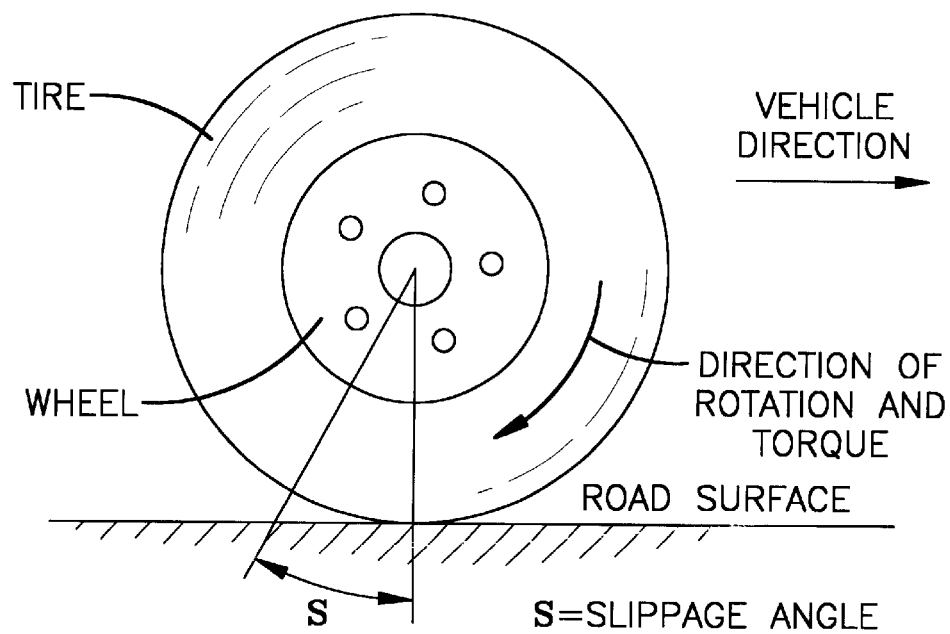
FIG. 1—Slippage of a drive wheel and tire.

Systems which are part of the wheel and braking system would measure small changes in angular velocity, as show in FIG. 2, of the wheel attributable to slippage between the tire and road surface shown in FIG. 1. The system would have the capability to measure minute slippages too small to be humanly detected. Since torque must be applied by the tire to the road surface to maintain constant vehicle velocity, a loss of RSF would cause intermittent slippage peaks in angular velocity of the wheel as shown in FIG. 2.

This system would measure the intermittent peaks for amplitude, duration and frequency and calculate RSF and inform the driver of the RSF condition. Automated braking systems (ABS) could be used to collect data and feed typical (ABS) data from each drive wheel position to a central computer. The software in the central computer would receive and interpret the data. The software would identify the intermittent slippage peaks and calculate their amplitude, duration and frequency. It would then use this information to calculate change in RSF and inform the drive of potentially hazardous RSF conditions.

Systems which are independent of the rotating wheel and braking assembly would most preferably consist of a measuring instrument mounted near the front under carriage of vehicle as shown in FIG. 3. The measuring instrument would be deployed to contact the road surface at a specified frequency or continually. The measuring instrument would most preferably measure RSF using a sensor in rotating contact with the road surface in the same fashion as a tire. The rotating sensor would embody some resistance to rotation so as to cause slip relative to the road surface for lower RSF conditions. Angular velocity would be measured with an encoder or like technology and fed to a central computer. The software would identify intermittent slippage valleys and calculate their amplitude, duration and frequency. It then would use this information to calculate change in RSF and inform the driver of potentially hazardous RSF conditions.

Prior art to be considered would be a variety of automatic traction control systems available in the past. The principal difference between traction control systems and this RSF monitoring system is that traction control systems automatically transfer drive torque from a slipping wheel to another drive wheel or wheels to permit the vehicle to maintain velocity or accelerate without alarming the driver of a potentially dangerous RSF condition. Traction control systems can give a driver a false sense of security and enable him to drive faster when he should be slowing down to be safe.

What is claimed is:

1. A system for a vehicle traveling on road surfaces to measure the road surface friction (RSF) of a road surface and to advise the driver of the road condition, the system comprises:

a means for measuring or sensing the RSF condition;

a means for calculation and analyzing the RSF condition;

a means for smitting the RSF condition to the driver; and wherein the system is mounted on the vehicle and the means for measuring or sensing the RSF condition is part of the rotating drive wheel of the vehicle, the means for ensuring or sensing tire to road surface slippage detects increases in angular velocity of the drive wheel as torque is applied by the tire to the road surface as the vehicle tries to maintain constant velocity or is accelerating.

2. The system of claim 1 wherein the means for measuring or sensing the RSF condition uses an automated braking system to collect data and feed data from each drive wheel position to a central computer.

3. The system of claim 1 wherein the means for calculating and analyzing the RSF condition further comprises software and a central computer, the software identifies intermittent slippage peaks and calculates the amplitude, duration and frequency of said slippage peaks.

* * * * *